United States Patent
Delaney et al.

(10) Patent No.: US 11,934,642 B2
(45) Date of Patent: Mar. 19, 2024

(54) RECOMMENDATION OF MEDIA CONTENT BASED ON USER ACTIVITY DURATION

(71) Applicant: Lenovo (Singapore) Pte. Ltd., Singapore (SG)

(72) Inventors: Mark Delaney, Raleigh, NC (US); Nathan Peterson, Oxford, NC (US); John C. Mese, Cary, NC (US); Arnold Weksler, Morrisville, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/845,363

(22) Filed: Jun. 21, 2022

(65) Prior Publication Data
US 2023/0409173 A1 Dec. 21, 2023

(51) Int. Cl.
*G06F 3/0484* (2022.01)
*G06F 3/0482* (2013.01)
*G06V 20/60* (2022.01)

(52) U.S. Cl.
CPC .......... *G06F 3/0484* (2013.01); *G06F 3/0482* (2013.01); *G06V 20/60* (2022.01)

(58) Field of Classification Search
CPC ...... G06F 3/0484; G06F 3/0482; G06V 20/60
See application file for complete search history.

(56) References Cited

U.S. PATENT DOCUMENTS

| | | | |
|---|---|---|---|
| 2021/0255747 A1* | 8/2021 | Devine | G06F 3/0488 |
| 2023/0013876 A1* | 1/2023 | Channapragada | H04N 21/4335 |
| 2023/0156885 A1* | 5/2023 | Beaumier | G06F 3/0481 715/835 |

* cited by examiner

*Primary Examiner* — Cao H Nguyen
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to identify a first duration of an activity associated with a user and, based the identification, recommend media content having a second duration similar to the first duration to within a threshold.

20 Claims, 6 Drawing Sheets

RECOMMENDATION OF MEDIA CONTENT BASED ON USER ACTIVITY DURATION

FIELD

The disclosure below relates to technically inventive, non-routine solutions that are necessarily rooted in computer technology and that produce concrete technical improvements. In particular, the disclosure below relates to recommendation of media content based on a user activity duration.

BACKGROUND

As recognized herein, with technological advances in wearable devices, 5G communications, and streaming media, users are now more freely able than ever to consume digital media while doing another activity. However, the disclosure below recognizes that often times the duration of the activity is not the same as the duration of the digital media itself, leading to situations where the user's activity finishes well before the digital media has been played to completion as well as situations where the digital media plays to completion well before the user's activity finishes. Current digital content recommendation engines running on servers and other devices fail to adequately address this and, as such, there are currently no adequate solutions to the foregoing computer-related, technological problem.

SUMMARY

Accordingly, in one aspect a device includes at least one processor and storage accessible to the at least one processor. The storage includes instructions executable by the at least one processor to identify a first duration of an activity associated with a user. The instructions are also executable to, based the identification, recommend media content having a second duration similar to the first duration to within a threshold.

In some example implementations, the device may include a display accessible to the at least one processor, and the instructions may be executable to present a graphical user interface (GUI) on the display. The GUI may indicate the recommended media content and may also include a selector to command the device to begin presenting the recommended media content.

In various example embodiments, the first duration may be identified based on the activity transpiring in the future and within a threshold time of a current time of day.

Also in various example embodiments, the first duration may be identified based on data from an electronic calendar associated with the user. Additionally or alternatively, the first duration may be identified based on user input to a maps application and/or a navigation application. As another example, the first duration may be identified based on data from an email account associated with the user.

Still further, in some instances the first duration may be identified based on launch of an application associated with the activity. The application may be a fitness application, and if desired the first duration may be identified based on an average exercise time associated with the user. The average exercise time may be based on past exercise. Additionally or alternatively, the application may be an application for a particular airline carrier, the activity may be flying, and the first duration may be a duration of a flight on which the user is booked as identified from the application for the particular airline carrier.

As yet another example, the first duration may be identified based on input from a camera. So in some instances the instructions may be executable to execute object recognition using the input from the camera to identify an object associated with physical exercise and then, based on the identification of the object associated with the physical exercise, identify the first duration based on an anticipated length of the physical exercise.

In various example embodiments, the media content may include a playlist of plural songs the total duration of which have the second duration to within the threshold. Also in various example embodiments, the threshold may be plus/minus one minute and/or an end-user-designated threshold amount of time. In one specific example implementation, the media content may be recommended based on the second duration being less than the first duration but by no more than the threshold.

In another aspect, a method includes identifying, at a device, a first duration of an activity associated with a user. The method also includes, based the identifying, presenting on a display a recommendation of media content that has a second duration that is similar to the first duration to within a threshold.

In certain examples, the first duration may be identified based on data from a gyroscope and/or an accelerometer. Also in certain examples, the media content may be recommended based on the second duration being less than the first duration but by no more than the threshold.

In still another aspect, at least one computer readable storage medium (CRSM) that is not a transitory signal includes instructions executable by at least one processor to identify, at a device, a first duration of an activity associated with a user. The instructions are also executable to, based the identification, present a recommendation of media content that has a second duration that is similar to the first duration to within a threshold.

In certain example implementations, the first duration may be identified based on data from an online web site indicating a flight duration for an airplane flight associated with the user.

The details of present principles, both as to their structure and operation, can best be understood in reference to the accompanying drawings, in which like reference numerals refer to like parts, and in which:

DETAILED DESCRIPTION

Figure 1:
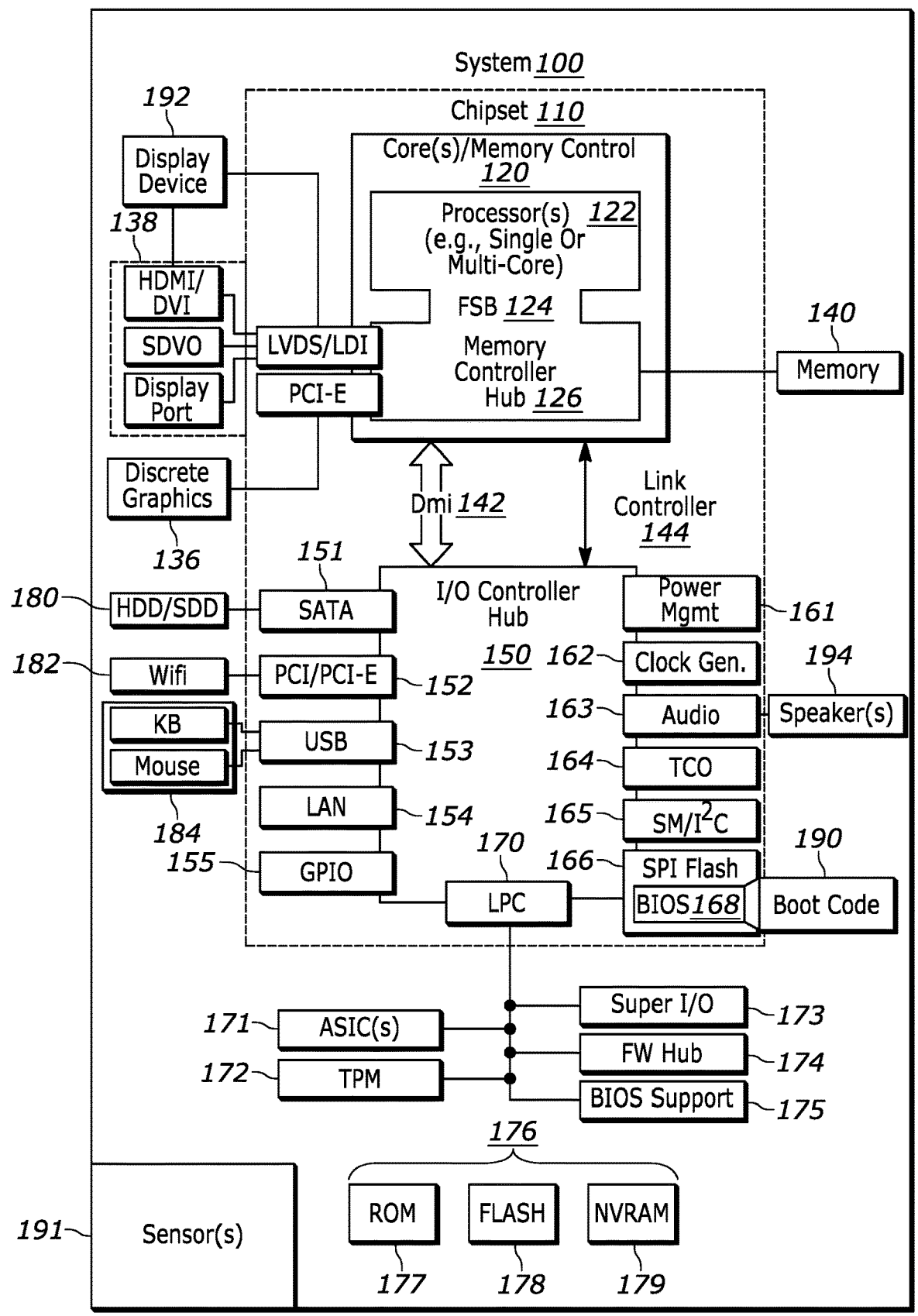
FIG. 1 is a block diagram of an example system consistent with present principles.

Among other things, the detailed description below discusses proactive media recommendations to a user based on anticipated activity duration for an activity of the user. In this way, a user may be able to fully listen to a podcast while driving (with the podcast being played to completion by the end of the driving), listen to music while running (with the music being played to completion by the end of the run), or watching a movie on a flight (again with the movie being fully played to completion by the end of the flight).

To do so, the device may use calendar data, assumed user intent, and other metadata/inputs to strengthen or guide the recommendation engine. E.g., IoT connectivity may be used to triangulate user activity.

As a use case, suppose a user enters into his GPS application a coordinate/destination that is 46 minutes away by car. In this case, the device may recommend various podcasts that are each approximately 46 minutes long.

As another use case, suppose the user has just boarded an airplane for a flight, and the device knows that the flight time is 1 hour and 22 minutes away for reaching the flight's destination. Here too the device can recommend media such as movies or other audio video content that are each approximately the same length as the flight time but still less than the flight time itself (1 hour, 22 minutes in this example).

As yet another use case, if a user is about to go for a run/jog and the device knows the user typically runs for 24 minutes on average, the device may recommend a playlist of songs that have a playout time of 24 minutes.

However, further note that there may be some instances where the user wishes to observe certain media regardless of whether the play time matches the duration of the user's activity, and so a manual override may also be provided for such situations.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio such as recommended media content), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191 accessible to the processor(s) 122 to receive input therefrom. The sensor(s) 191 may include a gyroscope that senses and/or measures the orientation of the system 100 and provides related input to the processor 122, an accelerometer that senses acceleration and/or movement of the system 100 and provides related input to the processor 122, and and/or a magnetometer that senses and/or measures directional movement of the system 100 and provides related input to the processor 122.

Still further, the sensor(s) 191 may include an audio receiver/microphone that provides input from the microphone to the processor 122 based on audio that is detected, such as via a user providing audible input to the microphone. The sensor(s) 191 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, in certain implementations the sensor(s) 191 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
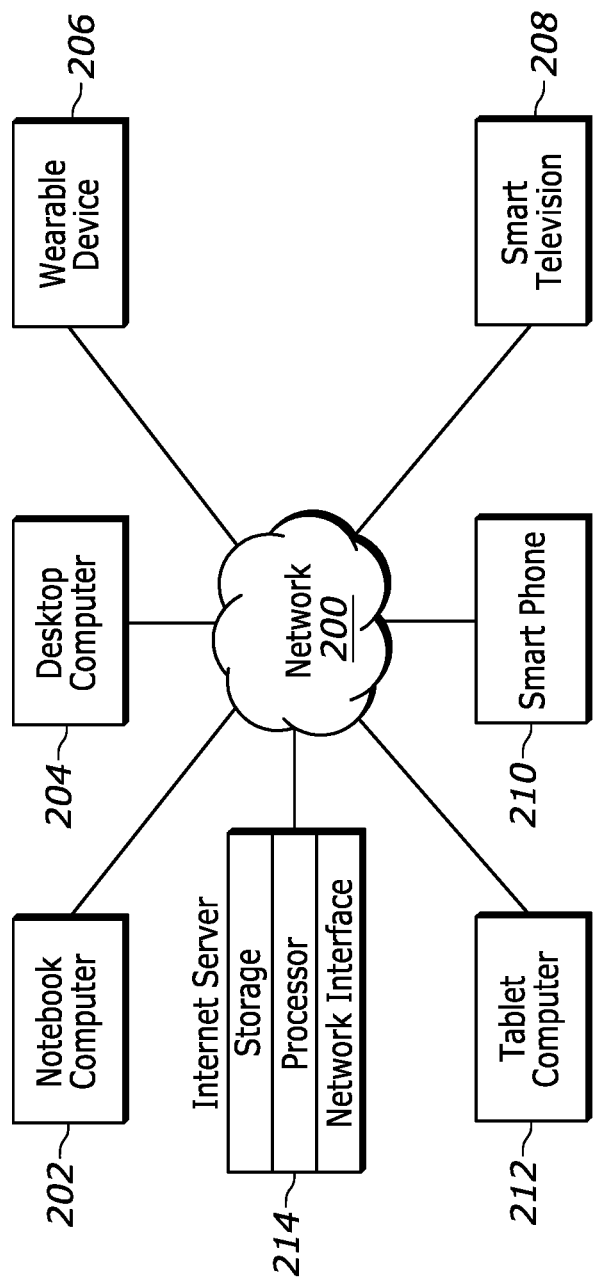
FIG. 2 is a block diagram of an example network of devices consistent with present principles.

Turning now to FIG. 2, example devices are shown communicating over a network 200 such as the Internet and/or a 5G cellular network in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
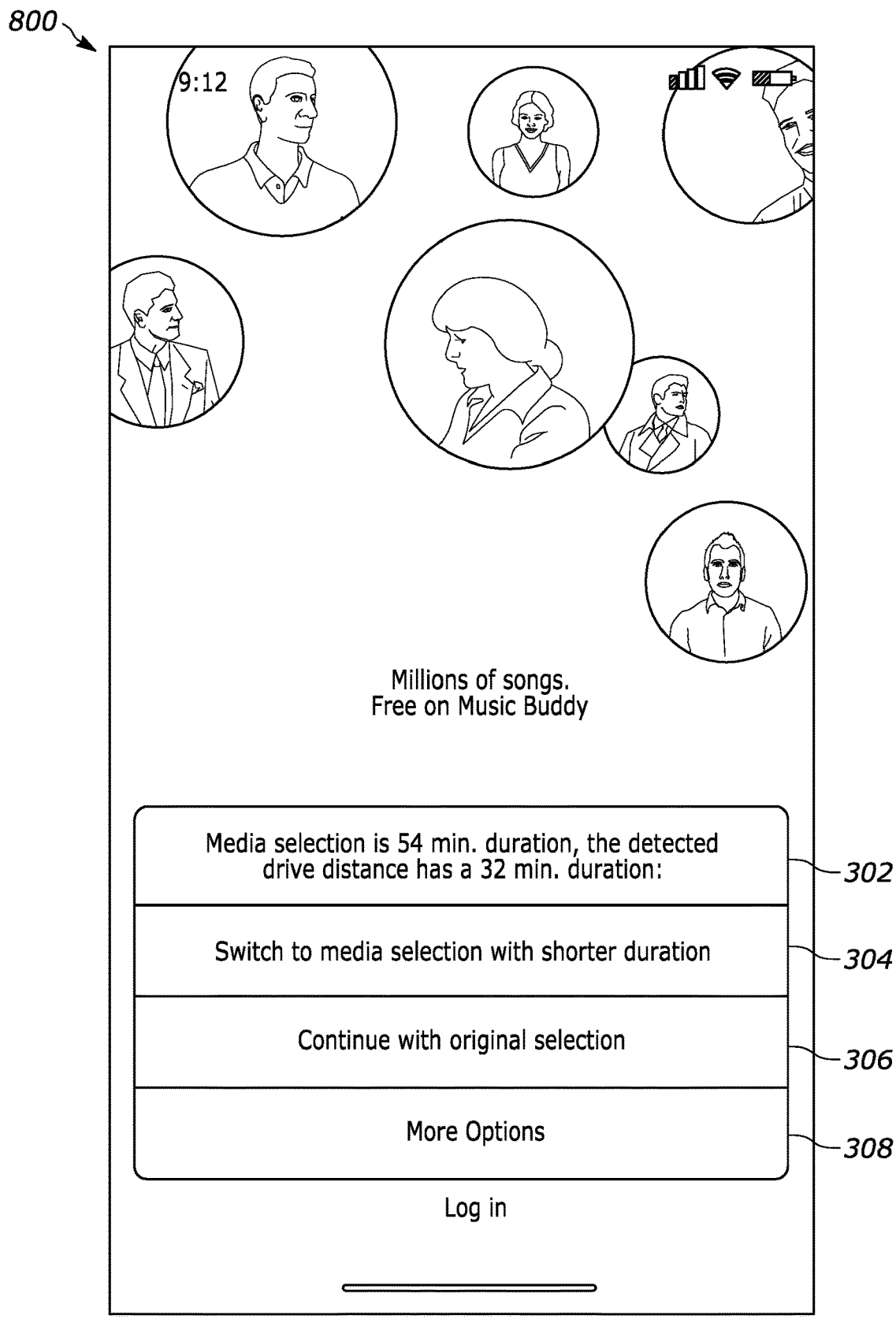
FIGS. 3 and 4 show various example graphical user interfaces (GUIs) that may be presented to recommend media content having a playtime/duration that matches an activity duration to within a threshold consistent with present principles.

Now in reference to FIG. 3, suppose an end-user has entered an address into a maps or navigational application executing at their smartphone in order to drive to a destination associated with the address. Also assume that before embarking, the user launches a separate media player application, such as an audio streaming application, and selects a particular podcast to listen to while driving to the destination. Responsive to the device's operating system or a dedicated application identifying the duration of the drive to the destination (such as based on a driving time duration provided by the maps/navigational application itself) and responsive to the user's media content selection, the GUI 300 of FIG. 3 may be presented (e.g., as a GUI for the device/dedicated application or as a GUI for the media player application itself).

Accordingly, as shown in FIG. 3, the GUI 300 may include an indication 302 that the user's media content selection (the podcast) has a fifty four minute duration, but that the detected drive time to reach the user's destination is thirty two minutes. The GUI 300 may also include a selector 304 that is selectable via touch, cursor, or other input to command the device to switch to presenting media content with a shorter duration that matches the driving time (to at least within a threshold as will be explained later). Responsive to selection of the selector 304, the device may then autonomously select and begin presenting a piece of media content it has auto-picked that has a duration that matches the driving time duration. Or responsive to selection of the selector 304, the GUI 400 of FIG. 4 may be presented as will be described shortly.

However, still in reference to FIG. 3, also note that the GUI 300 may further include a selector 306 that is selectable to manually override the presentation of recommended media content having a duration matching the driving time duration, and to instead present the podcast already selected by the user (that has the fifty four minute duration). This might be useful if, for example, the user knows they will have more time available immediately after the first duration to continue listening to the podcast.

If desired, the GUI 300 may also include a "more options" selector 308. The selector 308 may be selectable to present a full list of all media content available to the device that has a duration matching the duration of the user's drive. Or the selector 308 may be selectable in some examples to present the GUI 400 of FIG. 4 (e.g., if the selector 302 itself causes selection and presentation of a given piece of auto-picked media content without user input specifying the content). Or the selector 308 may be selectable to present a GUI for configuring one or more settings related to media content recommendation based on anticipated user activity duration (such as the GUI 600 of FIG. 6 as will be described later).

Figure 4:
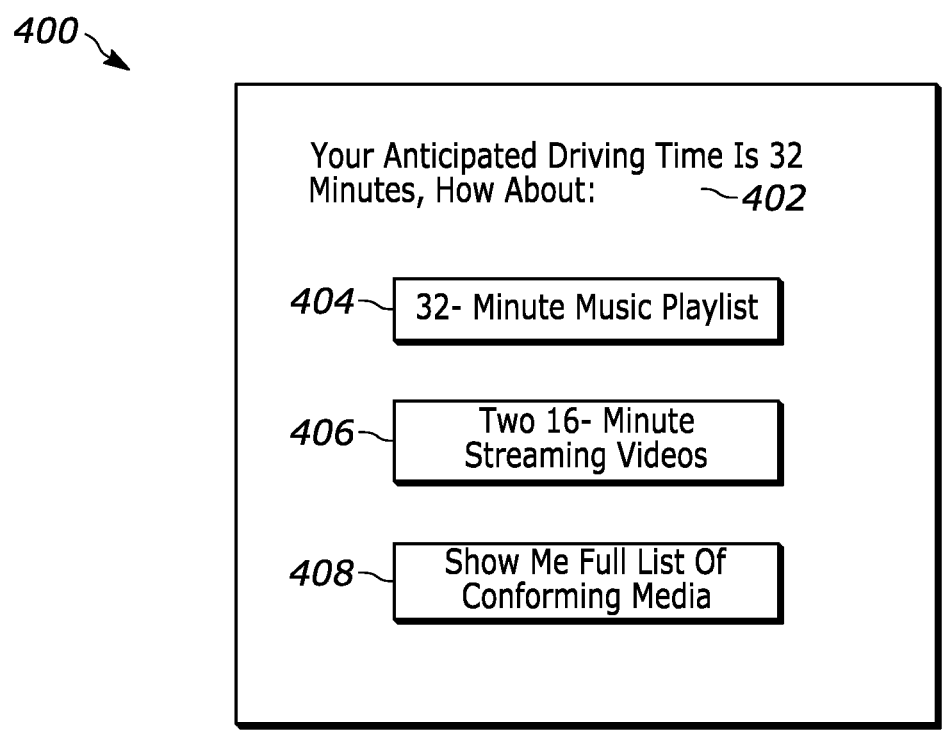

Now in reference to FIG. 4, the aforementioned GUI 400 is shown. But before describing FIG. 4 in detail, note that in addition to or in lieu of the GUI 400 being presented based on selection of one of the selectors from the GUI 300 per the description above, in some examples the GUI 400 might be autonomously presented without presenting the GUI 300 first. For example, the GUI 400 may be autonomously presented responsive to the device identifying the anticipated driving time/user activity, either without additional user input like launching the media player application itself or as a first screen of the media player application responsive to its launch.

In any case, as shown in FIG. 4 the GUI 400 may include an indication 402 that the user's anticipated driving time is thirty two minutes. The GUI 400 may also include respective selectors 404, 406 for selecting various media content having a duration that matches the driving time duration. For example, selector 404 may be selectable to command the device/media player application to begin presenting audio from a playlist of plural audio contents (e.g., songs) the total duration of which have a duration matching the driving time duration (e.g., with the songs being stored locally at the user's smartphone and/or accessible over the Internet as part of a streaming service). Selector 406 may be selectable to select a playlist of plural Internet-streaming videos the total duration of which have a duration matching the driving time duration. And though not shown, note that one or more selectors may also be presented on the GUI 400 for selecting a single piece of media content that also have a playtime matching the driving time duration (rather than a playlist of multiple contents per selectors 404 and 406).

As also shown in FIG. 4, in some examples the GUI 400 may also include a selector 408. The selector 408 may be selectable to command the user's smartphone to present a full list of all available media contents and/or combinations of contents that themselves conform/match the driving time duration. This might include various playlists dynamicallygenerated by the smartphone to have a playout duration matching the driving time duration. Thus, the selector 408 may be selected if the user does not like the recommendations provided via selectors 404, 406. Then once the full list has been presented as another GUI on the smartphone's display, the user may select one of the media contents or playlists from that list/GUI to then begin playout of the selected media during the user's device.

Figure 5:
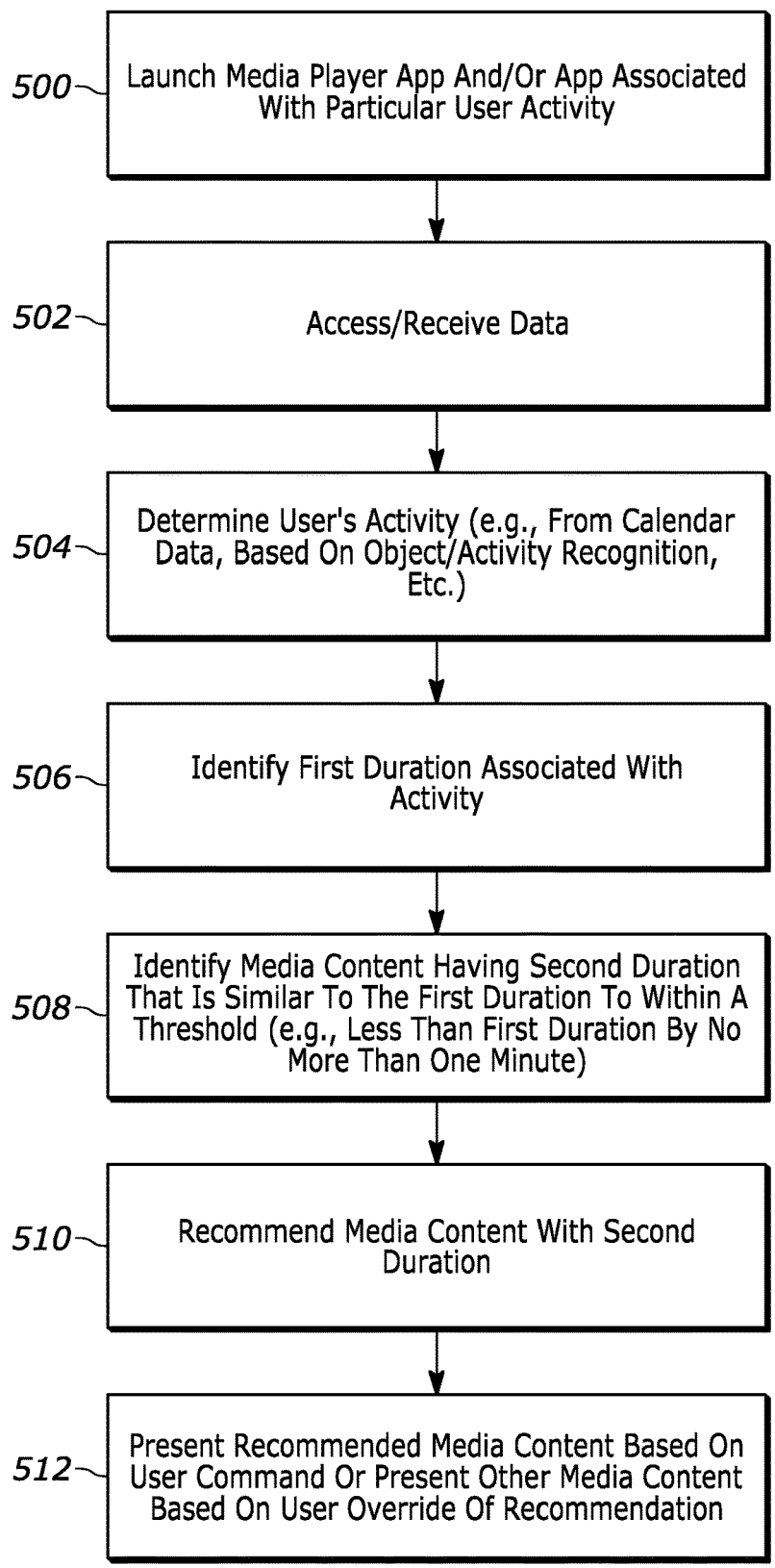
FIG. 5 illustrates example logic in example flow chart format that may be executed by a device consistent with present principles.

Continuing the detailed description in reference to FIG. 5, it shows example logic consistent with present principles that may be executed by a device such as the system 100 (e.g., a client device such as the smartphone of FIGS. 3 and 4) and/or a remotely-located server in any appropriate combination. Note that while the logic of FIG. 5 is shown in flow chart format, other suitable logic may also be used.

Beginning at block 500, the device may launch a media player application ("app") and/or an app that is associated with a particular user activity. For example, the associated app may be a fitness tracker app for tracking fitness/biometrics during physical exercise, or airline app for providing flight information about an upcoming flight on which the user is booked. Also note that the app launched at block 500 may be launched responsive to a command from the user themselves. From block 500 the logic may then proceed to block 502.

At block 502 the device may access and/or receive various types of data from which an activity of a user can be determined. The logic may then proceed to block 504 where the device may determine the user's activity based on the data to then, at block 506, identify a first duration associated with the activity itself.

Providing some examples per blocks 502-506 above, the first duration may be identified based on data from an electronic calendar associated with the user. For example, the device may already be connected to or otherwise have access to the user's electronic calendar hosted at a remotely-located server to then access the calendar to identify a specific calendar entry that either corresponds to the current time of day or that is to transpire in the future within a threshold time of the current time of day (e.g., within a relatively low threshold amount of time to reduce false positives, such as within five minutes of an activity scheduled to begin five minutes later). Keyword recognition, natural language processing, and other techniques may then be used to identify the activity from the data the user has already entered for that calendar entry (e.g., to distinguish actual calendar events for scheduled activities from placeholder entries for user "to-dos" and such) to then determine a duration of the activity from the identified activity itself.

For example, the calendar entry might indicate physical exercise, and the device may be preprogrammed with an average exercise time for the user or may have access to past exercise times that can be averaged to use the average as the first duration. As another example, the user may have created a calendar entry for "flight to Raleigh" that spans a time frame from 1:00 p.m. to 3:00 p.m., and the device may therefore determine that the first duration (for the flight) is two hours based on the time span for the associated calendar entry itself. Thus, note more generally that the device may determine the first duration from the length of the activity itself as indicated in the electronic calendar entry (e.g., regardless of whether the device actually identifies the associated activity itself before identifying the corresponding duration). However, also note here that per the flight example, the first duration for the flight might additionally or alternatively be determined using the flight number for the flight as indicated in the calendar entry to then look up the flight duration using an online website such as FlightAware that can be searched to identify the flight's duration.

Still in reference to blocks 502-506 and as another example, the first duration may be identified based on user input to a maps app, GPS app, and/or a navigation app. For example, the user might be embarking on a half-hour drive to a friend's house, and to navigate to the friend's house the user might launch a maps/GPS/navigation app and enter the destination address into the app to receive directions. The device may thus access the maps/GPS/navigation app's predicted travel time to use as the first duration.

Or if the user's time at their friend's house as has been entered into the user's electronic calendar and that entry in the calendar also indicates the address, the device may select the address from the calendar entry and then use the maps/GPS/navigation app itself or an Internet website to get directions from the user's current location (e.g., as determined using the device's GPS transceiver) to thus access the predicted travel time that way. Additionally, similar to the calendar entry, if the friend texted their address to the user, the device may access the device's text messages app to identify the address from the text message (and possibly a time at which the friend told the user to arrive by) for the device to then enter the address to the GPS app or Internet website to get directions from the user's current location and thus access the corresponding predicted travel time (and possibly determine that the threshold time referenced above has been reached based on a predicted departure time determined from the arrival time minus travel time).

Providing yet another example, the data accessed at block 502 may include data from an email account associated with the user. This data may then be used at blocks 504 and 506 similar to as set forth above. E.g., a friend of the user might have emailed their address to the user for the user to drive to the address, and so the address as identified from the email account may be used to identify the travel time to the address as the first duration. Or a flight on which the user is booked may be indicated in an itinerary email that the airline emailed to the user, and so the flight time indicated in the email may be used as the first duration.

As still another example, the first duration may be identified based on the mere launch at the device itself of an app associated with a particular activity. For example, the app might be a fitness app for fitness tracking, and so by the user launching the fitness app at their device the device may determine that the user is about to begin physical exercise imminently. The device may then determine the first duration based on an average exercise time for the user as tracked by the fitness app in the past (e.g., the fitness app knows how long the user's average jog time is).

Or if the user happened to enter a desired jogging route into the app or entered other data into the app for the specific physical exercise that the user is about to begin, that data may also be used. For example, a jogging distance may be determined from the route entered by the user, and the device may then determine the first duration by multiplying the total mileage of the route by the user's average mile jog time as tracked during past instances of jogging. As another example, if the user sets a timer for certain physical exercise, such as a timer for continuous exercise on a treadmill or elliptical machine, the total length of exercise as measured from the full length of the timer may be used as the first duration.

Still in terms of the example embodiment above involving launch of a particular app, if the app that is launched is an application for a particular airline carrier, launch of the app may be used by the device as an indication that the user is imminently about to fly to a destination. Accordingly, the first duration may be identified as a duration of a flight on which the user is booked as identified from/indicated in the app itself for the particular airline carrier (e.g., assuming the user is signed into their airline account for the app to reflect their upcoming flight).

As yet another example for blocks 502-506, the first duration may be identified based on input from a camera. So, using the exercise example from above again, the device may execute object recognition using the input from the camera to identify an object associated with physical exercise (such as running shoes, a baseball bat or golf clubs, or even a separate wearable fitness tracker device as being located on the user's wrist). Then based on the identification of the object associated with the physical exercise, the device may identify the first duration based on an anticipated length of the physical exercise (e.g., again using average exercise time from the past for a particular physical exercise activity, for example). As another example, if the device identifies a dog leash from the camera input, the device may determine that the user is about to walk their dog and, already having stored past dog walking times, the device may use the past average walk time as the first duration.

Similar to object recognition, activity recognition may also be executed using input from the camera. So if the device's camera captures the user engaging in physical exercise and the device already knows the user's average exercise time, the average exercise time may be used as the first duration.

Additionally, in some examples input from a microphone on the device may also be used. For example, natural language processing (NLP) and/or keyword recognition may be executed using the input to determine an activity the user verbally indicates they are doing or about to do (with the user possibly also verbally indicating a specific amount of time for the activity). This in turn may be used to determine the first duration based on the user verbally referencing the activity itself (and potentially also explicitly referencing its duration).

Providing an additional example for blocks 502-506, the first duration may be identified based on data from a motion sensor such as a gyroscope, magnetometer, and/or accelerometer. So, for example, if the gyroscope and/or accelerometer data indicate a predefined pattern associated with jogging (or another type of physical exercise), the device may then determine that the user is beginning a jog for which an average past jog time can be used as the first duration consistent with the disclosure above.

As yet another example for blocks 502-506, the first duration may be identified based on geolocation itself, e.g., as indicated using the device's GPS transceiver and/or as indicated via triangulation using Bluetooth beacon signals, Wi-Fi access point signals, Internet of things (IoT) device signals, etc. For example, the device may determine that the user has arrived at a location associated with a restaurant and, either having access to average dine times for others for that restaurant and/or knowing the user's own specific average dine time for restaurants, use that average time as the first duration. As another example, if location data indicates that the user is at a specific departure gate within an airport, the device may use an online website, airline app, or other data source to lookup the next flight that leaves from that departure gate to use the flight time of that flight as the first duration.

Still in reference to the logic of FIG. 5, from block 506 the logic may continue to block 508. At block 508 the device may identify media content having a second duration that is similar to the first duration to within a threshold. In some examples, the threshold may be plus/minus an end-user-designated threshold amount of time. Or the threshold may be plus/minus another threshold amount of time such as one minute so that the second duration matches the first duration enough to where the media playout will not be so short as to leave the user without media content to observe for latter parts of the first duration and will also not be so long as to leave the user unable to satisfactorily observe the media to completion within the length of time of the first duration. Or in some specific examples, to ensure the user can observe the media content to completion in less than the first duration so that the user does not have to begin doing something else before finishing observing the media, media content may be identified based on the second duration for that media content being less than the first duration but by no more than the threshold amount of time (to still not leave the user without media content to observe for a last portion of the first duration).

Note that the identified media content itself may include any number of things, such as audio-only podcasts and other recordings of users speaking (such as recorded video conferences), books on tape, music, audio/video content such as Internet/social media videos and movies/motion pictures, or even video-only content.

Also note that the identified media content may be media content accessible to the device over the Internet such as from a media streaming service, tube video sharing website, social media service, or even cloud storage for the user themselves. Additionally or alternatively, the media content may be stored locally at the device itself, such as in its hard drive or other persistent storage. But wherever stored or however accessed, the device may then access metadata for the respective media contents themselves (as may also be accessible from the same locations/services) to then identify individual playout times/play times for each content to determine whether the individual play times match the first duration to within the threshold. Additionally or alternatively, the device may autonomously, dynamically compile one or more playlists of media contents that individually have shorter play times that do not match the first duration by themselves but that can be added together for serial playout one immediately after the other, the total duration of which matches the first duration (at least to within the threshold).

From block 508 the logic may then proceed to block 510 where, based the identification of the media content(s) having the second duration similar to the first duration to within the threshold, the device may recommend the media content(s) having the second duration (e.g., individual contents and playlists). Thus, for example, the GUIs 300 or 400 of FIGS. 3 and 4 may be presented on the device's display at block 510. Or in some examples, at block 510 the device may autonomously begin presenting conforming content at the beginning of the activity without necessarily receiving user input to present the content. Also note that at block 510 the device might instead present other media content that does not match the first duration if the user has provided input overriding the recommendation consistent with the disclosure above.

Figure 6:
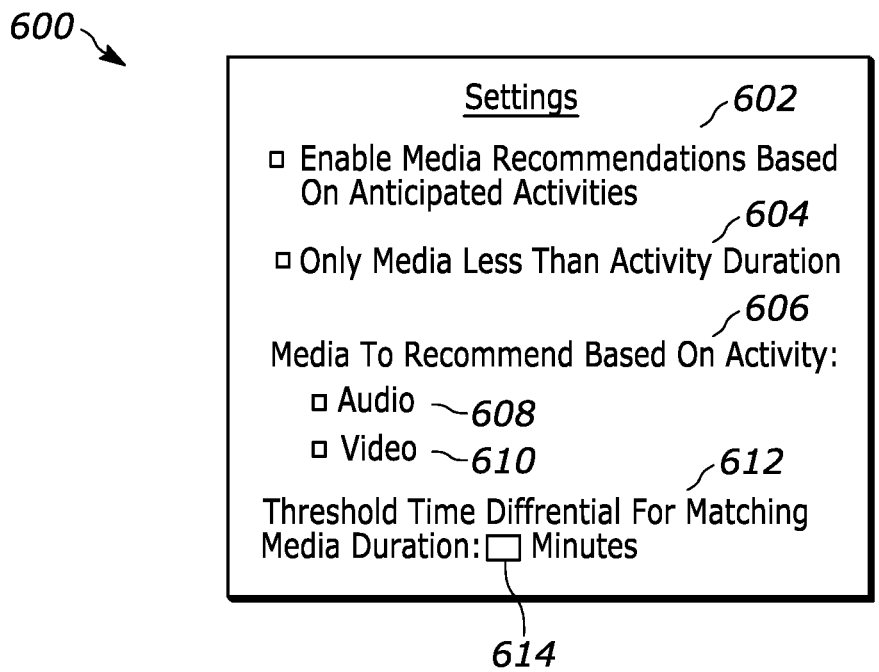
FIG. 6 shows an example settings GUI that may be presented on a display to configure one or more settings of a device to operate consistent with present principles.

Now in reference to FIG. 6, an example graphical user interface (GUI) 600 is shown that may be presented on the display of a device configured to undertake present principles to configure or enable one or more settings of that device to operate as described herein. The settings GUI 600 may be reached by navigating a settings menu of the device or a dedicated app menu, for example. Also note that in the example shown, each option or sub-option discussed below may be selected by directing touch or cursor input to the respective check box adjacent to the respective option.

Accordingly, as shown in FIG. 6, the GUI 600 may include an option 602 that may be selectable a single time to set or configure the device to perform proactive recommendation of media content based on a user's anticipated activity. For example, selection of the option 602 may configure the device to execute the logic of FIG. 5 and execute the other actions described above in reference to FIGS. 3 and 4 in multiple future instances over time as the user participates in various activities.

If desired, the GUI 600 may also include a sub-option 604 that may be selectable to set or configure the device to specifically only recommend media matching an activity duration to within a threshold but that is still less than the activity duration itself (e.g., so the user can ensure that they only get recommendations for media that can be completely observed within an allotted activity time).

Also if desired, in some examples a setting 606 may be presented with respective options 608, 610 to respectively select presentation of recommended audio content specifically (option 608) and recommended video content specifically (option 610) based on activity duration. Additionally, though not shown for simplicity, in some examples the GUI 600 may include a setting listing various options for selecting various particular activities the identification of which may trigger content recommendations of similar lengths (e.g., if the user does not wish for the recommendations to be made for any/all identified activities on a more global level).

Still further, in some examples the GUI 600 may include a setting 612 at which a threshold time differential may be set for media content duration to match activity duration. Thus, input may be directed to input box 614 to set an end-user-designated threshold amount of time as described above in reference to block 508.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A device, comprising:
at least one processor;
a display accessible to the at least one processor; and
storage accessible to the at least one processor and comprising instructions executable by the at least one processor to:
identify a first duration of an activity associated with a user; and
based on the identification, recommend media content having a second duration similar to the first duration to within a threshold at least in part by presenting a graphical user interface (GUI) on the display, the GUI indicating the recommended media content, the GUI comprising a selector to command the device to begin presenting the recommended media content;
wherein the threshold is plus/minus one or more of: one minute, an end-user-designated threshold amount of time.

2. The device of claim 1, wherein the first duration is identified based on the activity transpiring in the future and within a threshold time of a current time of day.

3. The device of claim 1, wherein the first duration is identified based on launch of an application associated with the activity.

4. The device of claim 3, wherein the application is a fitness application.

5. The device of claim 4, wherein the first duration is identified based on an average exercise time associated with the user, the average exercise time being based on past exercise.

6. The device of claim 1, wherein the first duration is identified based on input from a camera.

7. The device of claim 6, wherein the instructions are executable to:
execute object recognition using the input from the camera to identify an object associated with physical exercise; and
based on the identification of the object associated with the physical exercise, identify the first duration based on an anticipated length of the physical exercise.

8. The device of claim 1, wherein the media content comprises a playlist of plural songs the total duration of which have the second duration to within the threshold.

9. The device of claim 1, wherein the media content is recommended based on the second duration being less than the first duration but by no more than the threshold.

10. A method, comprising:
identifying, at a device, a first duration of an activity associated with a user; and
based the identifying, presenting on a display a recommendation of media content that has a second duration that is the same as the first duration to within a threshold, wherein the threshold is plus/minus one or more of: one minute, an end-user-designated threshold amount of time; and
wherein the recommendation is presented on the display via a graphical user interface (GUI) presented on the display, the GUI indicating the media content, the GUI comprising a selector to command the device to begin presenting the media content.

11. The method of claim 10, wherein the first duration is identified based on data from one or more of: a gyroscope, an accelerometer.

12. The method of claim 10, wherein the media content is recommended based on the second duration being less than the first duration but by no more than the threshold.

13. At least one computer readable storage medium (CRSM) that is not a transitory signal, the at least one computer readable storage medium comprising instructions executable by at least one processor to:
identify, at a device, a first duration of an activity associated with a user; and
based the identification, present a recommendation of media content that has a second duration that is the same as the first duration to within a threshold, wherein the threshold is plus/minus one or more of: one minute, an end-user-designated threshold amount of time; and
wherein the recommendation is presented via a graphical user interface (GUI) presented on a display, the GUI indicating the media content, the GUI comprising a selector to command the at least one processor to begin presenting the media content.

14. The CRSM of claim 13, wherein the first duration is identified based on data from an online website indicating a flight duration for an airplane flight associated with the user.

15. The device of claim 1, wherein the instructions are executable to:
receive input from a microphone;
execute natural language processing (NLP) using the input;
determine, based on the execution of the NLP, the activity; and
based on the determination of the activity from the execution of NLP, identify the first duration of the activity.

16. The method of claim 10, comprising:
receiving input from a microphone;
executing natural language processing (NLP) using the input;
determining, based on the execution of the NLP, the activity; and
based on the determining of the activity from the execution of NLP, identifying the first duration of the activity.

17. The device of claim 1, wherein the threshold is plus/minus one minute.

18. The device of claim 1, wherein the threshold is plus/minus the end-user-designated threshold amount of time.

19. The method of claim 10, wherein the threshold is plus/minus one minute.

20. The method of claim 10, wherein the threshold is plus/minus the end-user-designated threshold amount of time.

\* \* \* \* \*